United States Patent Office 3,847,906
Patented Nov. 12, 1974

3,847,906
PROCESS FOR THE MANUFACTURE OF β-(3-OXO-7α-ACETYLTHIO-17β-HYDROXY-4-ANDROSTEN-17α-YL)-PROPIONIC ACID γ-LACTONE
Kurt Radscheit, Kelkheim, Taunus, Ulrich Stache, Hofheim, Taunus, and Richard Brodersen, Frankfurt am Main, Germany, assignors to Farbwerke Hoechst Aktiengesellschaft vormals Meister Lucius & Bruning, Frankfurt am Main, Germany
No Drawing. Filed Oct. 3, 1973, Ser. No. 403,040
Claims priority, application Germany, Oct. 5, 1972, P 22 48 834.2
Int. Cl. C07c 173/00
U.S. Cl. 260—239.55 C           4 Claims

ABSTRACT OF THE DISCLOSURE

The present invention relates to an improved process for the manufacture of β-(3-oxo-7α-acetylthio-17β-hydroxy-4-androsten - 17α - yl)-propionic acid γ-lactone, in which β-(3β,17β-dihydroxy - 5 - androsien-17α-yl-(propionaldehyde ethylene acetal is oxidized according to Oppenauer, the β-(3-oxo-17β-hydroxy - 4 - androsten-17α-yl)-propionaldehyde ethylene acetal obtained is dehydrogenated and simultaneously cyclized, the β-(3-oxo-17β-hydroxy - 4,6 - androstadien-17α-yl)-propionaldehyde cyclohemiacetal methyl glycoside thus obtained is reacted with thio-acetic acid and the 3-(3' oxo-7'α-thio-acetyl-17'β-hydroxy - 4' - androsten - 17α - yl) - propionaldehyde cyclohemiacetal 1-thioacetate is oxidized to yield the corresponding γ-lactone; the invention further relates to a new intermediate useful in the process and having the formula

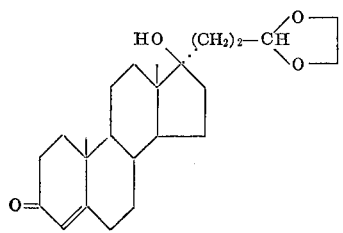

The present invention relates to a process for the manufacture of β-(3-oxo-7α-acetylthio - 17β - hydroxy-4-androsten-17α-yl)-propionic acid γ-lactone.

β-(3-oxo-7α-acetylthio - 17β - hydroxy-4-androsten-17α-yl)-propionic acid γ-lactone (spironolactone), which is known to reduce the release of aldosterone, may be advantageously prepared according to a preferred embodiment of the process disclosed in copending U.S. patent application Ser. No. 382,661 by reacting androstenolone with an organometallic compound formed in situ from β-chloro-propionaldehyde ethylene acetal with lithium to yield the β-(3β,17β-dihydroxy-5-androsten-17α-yl) - propionaldehyde ethylene acetal, cyclisizing this compound with a mixture of methanol/hydrochloric acid to yield the β-(3β,17β-dihydroxy-5-androsten-17α - yl) - propionaldehyde cyclohemiacetal methyl glycoside, oxidizing the methyl glycoside according to the Oppenauer method to yield the β-(3-oxo - 17β - hydroxy-4-androsten-17α-yl)-propionaldehyde cyclochemiacetal methyl glycoside, dehydrogenating the 3-ketone with chloranil in a methanolic solution to yield the corresponding β-(3-oxo-17β-hydroxy-4,6-androstadien-17α - yl) - propionaldehyde cyclohemiacetal methyl glycoside, reacting this methyl glycoside with thioacetic acid to yield the 3-(3'-oxo-7'α-thioacetyl-17'β-hydroxy - 4' - androsten - 17α - yl)-propionaldehyde cyclochemiacetay 1-thioacetate and oxidizing this compound with chromic acid. In this manner, the spironolactone is obtained with an overall yield of about 12 percent, calculated on androstenolone used.

It has now been found that β-(3-oxo-7α-acetylthio-17β-hydroxy-4-androsten - 17α - yl) - propionic acid γ-lactone can be obtained in an even more economic manner by oxidizing β-(3β,17β - dihydroxy - 5 - androsten-17α-yl)-propionaldehyde ethylene acetal according to the Oppenauer method, dehydrogenating the β-(3-oxo-17β-hydroxy-4-androsten - 17α - yl)-propionaldehyde ethylene acetal obtained with chloroanil in methanol with simultaneous cyclization, reacting the β-(3-oxo-17β-hydroxy-4,6-androstadien - 17α - yl) - propionaldehyde cyclohemiacetal methyl glycoside obtained in this manner with thio-acetic acid and oxidizing the 3-(3'-oxo-7'α-thioacetyl-17'β-hydrovy-4' - androsten-17'α-yl)-propionaldehyde cyclohemiacetal 1-thio-acetate obtained with chromic acid to yield the corresponding γ-lactone.

The process of the invention proceeds according to the following scheme:

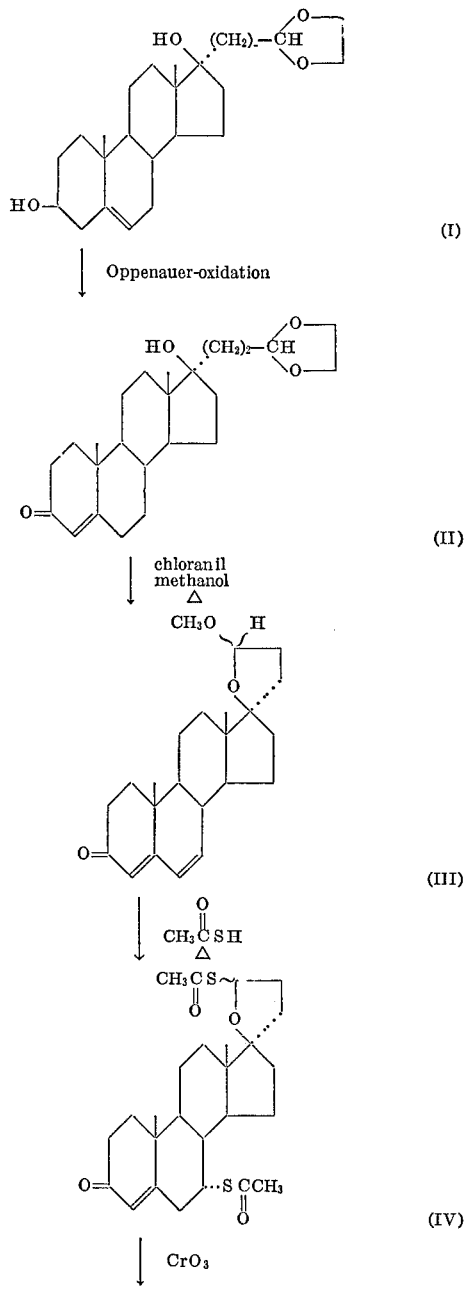

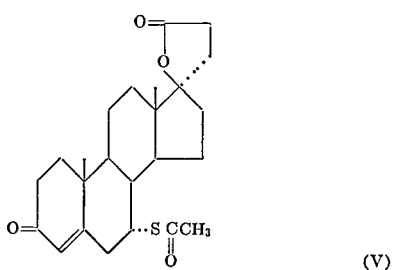

(V)

It is known (cf. Org. Reactions, vol. 6, p. 233) that it is often very difficult to isolate crystallized reaction products obtained according to Oppenauer reactions since condensation products, for example mesityl oxide are additionally obtained, using acetone as a hydride acceptor. These condensation products very often render difficult or even prevent crystallization of the reaction products.

For example, as cited in the above-mentioned patent application, the β-(3-oxo-17β-hydroxy-4-androsten - 17α-yl)-propionaldehyde cyclohemiacetal methyl glycoside obtained by the Oppenauer oxidation of β-(3β,17β-dihydroxy - 5 - androsten-17α-yl) - propionaldehyde cyclohemiacetal methyl glycoside can only be isolated as an amorphous distillation residue consisting of the diastereomer mixture of β-(3 - oxo - 17β -hydroxy-4-androsten-17α-yl) - propionaldehyde cyclohemiacetal methyl glycoside and undesired condensation products. As the manufacture of spironolactone continues, this process therefore requires a purification step, preferably purification by chromatography, during a suitable intermediate step (for example, purification of the β-(3-oxo-17β-hydroxy - 4,6-androstadien-17α-yl) - propionaldehyde cyclohemiacetal methyl glycoside), which can only be carried out on an industrial scale using additional apparatus and facing lower throughput and major losses in yield.

Surprisingly, it was now found that the Oppenauer oxidation of β-(3β,17β,-dihydroxy-5-androsten-17α-yl)-propionaldehyde ethylene acetal (I) yields the β-(3-oxo-17β-hydroxy-4-androsten-17α-yl) - propionaldehyde ethylene acetal (II) as a crystallized product in a high yield so that purification by chromatography is not required at this or one of the following reaction steps of the process. It was further found that dehydrogenation of β-(3-oxo-17β-hydroxy-4-androsten - 17α - yl) - propionaldehyde ethylene acetal (II) with chloranil in methanol results not only in the corresponding Δ⁴,⁶-dien-3-one but that the same reaction yields the corresponding cyclohemiacetal methyl glycoside (III) via the tetrachlorohydroquinone, which has formed from the chloranil, from the hydroxy-propionaldehyde ethylene acetal radical in 17 position.

Compared to the already proposed process for the manufacture of spironolactone, the process of this invention is characterized in that it can be carried out in a simpler way, comprises one step less and provides the spironolactone in an overall yield which is about three times higher.

The β-(3β,17β-dihydroxy-5-androsten-17α-yl)-propionaldehyde ethylene acetal used as starting compound for the process of the invention may be prepared according to the process disclosed in the above-cited patent application by reacting androstenolone with β-lithium propionaldehyde ethylene formed in situ.

The oxidation reaction according to Oppenauer is carried out in known manner, preferably using as an alkoxide aluminum tert.-butylate or aluminum isopropylate, as a ketone acetone or cyclohexanone and as a solvent benzene or toluene (cf. "Steroid Reactions" by Carl Djerassi, Holden-Day Inc., San Francisco, 1963, p. 89 et seq.). The reaction mixture is worked up in the usual manner, for example by stirring it in water and separating the organic phase, from which the β-(3-oxo-17β-hydroxy-4-androsten-17α-yl)-propionaldehyde ethylene acetal may then be obtained in crystallized form after concentration and optional addition of solvent in which the desired product is only sparingly soluble.

The compound of the formula (II) is dehydrogenated in methanol with simultaneous cyclization at an elevated temperature, preferably at the boiling temperature of the reaction mixture. The product is isolated in the conventional manner, for example by stirring the reaction solution in water and subsequently extracting it with an organic solvent. Further purification of the crude product obtained is generally not required.

The dithio-acetate (IV) is prepared from the compound of the general formula (III) by heating the steroid in thioacetic acid as a solvent, preferably at boiling temperature.

Furthermore, according to the present invention, the dithioacetate (IV) thus obtained is oxidized in an acid solution with chromic acid while the thioacetyl group is split off in the cyclohemiacetal to yield the spironolactone (V).

It could not be expected that the oxidation reaction yielding the β-(3-oxo-7α-acetylthio-17β-hydroxy-4-androsten-17α-yl)-propionic acid γ-lactone would be possible in an acid medium since these conditions would have suggested elimination of thioacetic acid 7α-position. Since, normally, Δ⁴-3-oxo steroids are enolized under the influence of protons and the acetyl group inked to the allyl group of the enol thus formed can very easily be eliminated, it could rather be expected that the 3-oxo-4,6-diene system is more likely to be formed according to the following reaction mechanism, thioacetic acid being split off:

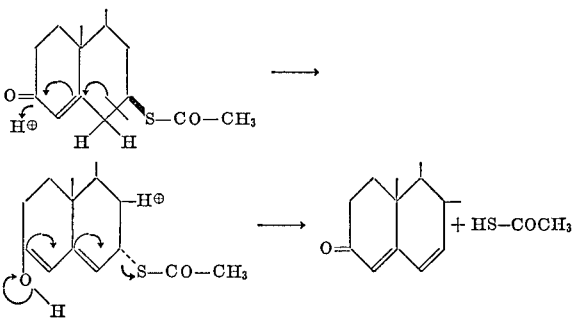

Surprisingly, however, the thioacetyl group is not split off during the oxidation according to the process of the invention. This was the more unlikely to be assumed the less stable the substituents in 7α-position linked via a hetero atom in a 3-oxo-4-ene steroid. For example, a 7α-acetoxy group in such a steroid is, as experience has shown, so unstable that it is often eliminated under the mildest conditions, for example of chromatography on alkali-free aluminum oxide, to yield the corresponding 3-oxo-4,6-diene (cf. for ex. Helvetica Chimica Acta, vol. 38, p. 387, 1955). It is known that a 7α-hydroxy group of a 3-oxo-4-ene steroid is very easily split off both in an acid medium and in an alkaline medium, while water is eliminated and a double bond in 6,7-position is formed.

Since 7α-acetylthio-Δ⁴-3-oxo steroids are known to split off thio-acetic acid in an alkaline medium to yield the corresponding 3-oxo-4,6-diene (cf. Journal of Organic Chemistry, vol. 26, 1961, p. 3922), a reaction in an acid medium was also expected to be analogous in the case of 7α-acetylthio compounds and of 7α-hydroxy compounds and give 3-oxo-4,6-diene. In the present case, however, the acetylthio group in 7α-position is surprisingly left untouched.

The oxidation reaction is carried out using chromium trioxide in an acid solution, especially in lower alkanecarboxylic acids, such as acetic acid, propionic acid or butyric acid as a solvent, preferably glacial acetic acid or also chromium-sulfuric acid in acetone.

The reaction temperatures generally range from 0 to 80° C. and the reaction times from 10 minutes to 48 hours, depending on the oxidizing agents and on the reaction temperatures. The crude product obtained after a usual extraction method is then purified by chromatography.

Compared to the known process for the manufacture of spironolactone (cf. Ehrhart/Ruschig "Arzneimittel," pp. 953 and 1000 (1968)), the process of the present invention has the advantage of reducing the number of steps for its preparation, dispensing with the use of acetylene which is difficult and dangerous to handle and, moreover, producing spironolactone in substantially better yields.

The following examples illustrate the invention.

EXAMPLE 1

β-(3-oxo-17β-hydroxy-4-androsten-17α-yl)-propionaldehyde ethylene acetal (II)

50 grams of β-(3β-17β-dihydroxy-5-androsten-17α-yl)-propionaldehyde ethylene acetal (I) obtained according to the method disclosed in the above-cited patent application, Example 1(a), were dissolved in 900 ml. of absolute toluene. Moisture, if any, was removed by distilling off 150 ml. from the solution. Subsequently, 15 g. of aluminium tert.butylate and 120 ml. of acetone were added and the mixture refluxed for 3 hours under a nitrogen atmosphere. The mixture was then stirred with 500 ml. of water and 5 g. of a filtration promoter (crystal theorite) for 30 minutes. The solids content was separated by filtration, then organic phase in the filtrate was separated, washed to neutral with water, dried over sodium sulfate and concentrated to a volume of 60 ml. while stirring in vacuo. While stirring, 250 ml. of di-n-butyl ether were added portionwise to the concentrate of 40° C., stirring was continued for 30 minutes and, after crystallization had begun, the reaction mixture was cooled to 0° C. The crystallized precipitate was suction-filtered, washed with 100 ml. of di-n-butyl ether and dried at 60° C. in vacuo. 40 grams of crystals (II) were obtained.

Melting point: 120–130° C.
UV: $\lambda_{max.}=240$ mµ.

EXAMPLE 2

β-(3-oxo-17β-hydroxy-4,6-androstadien-17α-yl)-propionaldehyde cyclohemiacetal methyl glycoside (III)

62 milliliters of methanol and 2.59 g. of chloranil were added to 3.8 g. of crystallized β-(3-oxo-17β-hydroxy-4-androsten-17α-yl)-propionaldehyde ethylene acetal (II) and the mixture was refluxed for 3 hours. The mixture was then stirred with 120 ml. of water and extracted with methylene chloride. The collected methylene chloride phases were successively washed with a 1N sodium hydroxide solution containing 3% of sodium dithionite, and a saturated sodium chloride solution. The methylene chloride solution washed to neutral was then dried over sodium sulfate, stirred for 15 minutes with 3 g. of aluminium oxide (standardized according to Brockmann), then filtered and evaporated in vacuo at a maximum bath temperature of 50° C. until a residue was obtained. The distillation residue (2.75 g.) consisted of amorphous β-(3-oxo-17β-hydroxy-4,6-androstadien-17α-yl)-propionaldehyde cyclohemiacetal methyl glycoside (III) which was used without further treatment for the following process step (Example 3).

UV: $\lambda_{max.}=285$ mµ (CH$_3$OH), E ~19,000.

EXAMPLE 3

3-(3'-oxo-7'α-thioacetyl-17'β-hydroxy-4'-androsten-17'α-yl)-propionaldehyde cyclohemiacetal 1-thio-acetate (IV)

115 grams of β-(3-oxo-17β-hydroxy-4,6-androstadien-17α-yl)-propionaldehyde cyclohemiacetal methyl glycoside (III) and 782 g. of thioacetic acid were refluxed together for 30 minutes. Excess thioacetic acid was distilled off in vacuo and the distillation residue was freed as far as possible from thioacetic acid by allowing it to stand in vacuo for a prolonged period of time. The amorphous residue was used without further purification for the oxidation reaction (Example 4).

UV: $\lambda_{max.}=238$–240 mµ (CH$_3$OH), E ~17,000.
IR: 1090–1140 cm.$^{-1}$.

EXAMPLE 4

β-(3-oxo-7α-acetylthio-17β-hydroxy-4-androsten-17α-yl)-propionic acid γ-lactone (V)

30.6 grams of 3-(3'-oxo-7'α-thioacetyl-17β'-hydroxy-4'-androsten-17'α-yl) - propionaldehyde cyclohemiacetal 1-thioacetate (IV) were dissolved in 1 l. of acetone and, while stirring, a solution of 20.45 g. of chromium-(1N) oxide and 23.05 ml. of concentrated sulfuric acid and 59.35 ml. of water was added portionwise within 15 minutes at a temperature of 2° to 3° C. After stirring had been continued for 1 hour at room temperature, the same amount of chromium trioxide solution was added under the same conditions. Stirring was continued for 4 hours at room temperature, the solution was poured into 3 l. of water and extracted with methylene chloride. The methylene chloride solution was successively washed with a saturated sodium bicarbonate solution and a saturated sodium chloride solution until neutral, dried over sodium sulfate, filtered and evaporated in vacuo. The β-(3-oxo-7α - acetylthio-17β-hydroxy-4-androsten-17α-yl)-propionic acid γ-lactone obtained as a residue was purified by chromatography on 750 g. of silica gel (elution with benzene/chloroform 7:3) and recrystallization from ether. 17 grams of spironolactone were obtained; m.p. 208–209° C., $\lambda_{max.}=237.5$ mµ.

What is claimed is:

1. A process for the manufacture of β-(3-oxo-7α-acetylthio-17β-hydroxy-4-androsten-17α-yl)-propionic acid γ-lactone, which comprises oxidizing β-(3β,17β-dihydroxy-5-androsten-17α-yl)-propionaldehyde ethylene acetal according to the Oppenauer method, dehydrogenating the β-(3-oxo - 17β - hydroxy-4-androsten-17α-yl)-propionaldehyde ethylene acetal obtained with chloranil in methanol with simultaneous cyclization, reacting the β-(3-oxo-17β-hydroxy - 4,6 - androstadien-17α-yl)-propionaldehyde cyclohemiacetal methyl glycoside thus obtained with thio-acetic acid and oxidizing the 3-(3'-oxo-7'α-thio-acetyl-17'β-hydroxy-4'-androsten-17'α-yl) - propionaldehyde cyclohemiacetal 1-thioacetate with chromic acid to yield the corresponding γ-lactone.

2. A process as claimed in claim 1, wherein the oxidation reaction according to Oppenauer is carried out using the system aluminium tert.-butylate/acetone/toluene.

3. A process as claimed in claim 1, wherein the oxidation reaction is carried out using chromic acid in acetone or glacial acetic acid.

4. A compound of the formula

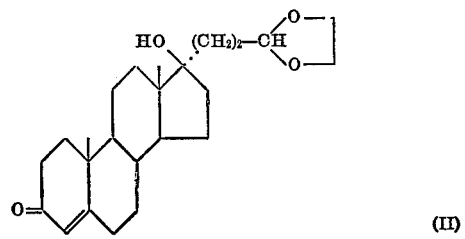

(II)

No references cited.

HENRY A. FRENCH, Primary Examiner

U.S. Cl. X.R.

260—239.55 R, 239.57